Patented Nov. 27, 1945

2,390,035

UNITED STATES PATENT OFFICE 2,390,035

METHOD OF TREATING POLYMERIC VINYLIDENE CHLORIDE

Ralph M. Wiley, Midland, Mich., assignor to The Dow Chemical Company, Midland, Mich., a corporation of Michigan No Drawing. Application October 15, 1942, Serial No. 462,143

7 Claims. (Cl. 18—48)

This invention relates to vinylidene chloride polymers, copolymers, or interpolymers, and more particularly to improved articles thereof having a crystalline structure and to the method of producing such articles.

In the conventional articles such as cordage, filaments, fibers, film, rattan, etc., of polymeric vinylidene chloride, the material is crystalline and not always clear. Instead the crystalline material exhibits an undesirable haziness impairing its appearance and translucency. In the usual fabricating operations the material is first heated until fused or liquefied sufficiently to enable it to flow under pressure. The fused material is then shaped by extrusion through an orifice or die or by molding, and the shaped material is then allowed to harden and crystallize. In some instances as in cordage or fiber making, the shaped material while still fused is chilled rapidly to cause it to supercool. In the supercooled state the material is ductile and mechanically deformed or cold worked to a limited extent as by stretching, thereby giving improved tensile strength to the product. The supercooled material at ordinary or elevated temperatures but well below the fusion point reverts to the crystalline state in time and this reversion is hastened by mechanical deformation. As the reversion from the supercooled state to the crystalline state occurs, the material loses its ductility or cold workability. The final shape or form, therefore, must be attained while the material is in either the fused or the supercooled state. Particular disadvantages of this method of fabricating articles are that the duration of the supercooled state is short, thus limiting the time in which to carry out cold working operations and the translucency of the resulting articles is impaired by a haziness which appears throughout the body of the material when crystallized.

One of the objects of the invention is to provide a solidified vinylidene chloride polymer, copolymer, or interpolymer which is free from haziness and remains in a ductile or cold workable state for a much longer time than such materials conventionally prepared.

Another object of the invention is to provide a method of treating a vinylidene chloride polymer, copolymer, or interpolymer to produce a crystallized ductile product thereof.

Other objects and advantages will become apparent as the description of the invention proceeds.

I have discovered that by thermally conditioning a supercooled vinylidene chloride polymer, copolymer, or interpolymer at about 20° C. or below for a suitable period of time and then causing it to crystallize, the duration of the state of cold workability is greatly prolonged and the material is either substantially or entirely free from haziness whether or not subsequently deformed. In addition, I have found that by the foregoing method the toughness of the material is improved.

In carrying out the invention the material on which it is to be practiced is heated until it is fused or noncrystalline, a state which is shown by the absence of an X-ray diffraction pattern. This fused state is produced by heating the material to a temperature above about 165° C., preferably above 175° C. but below the decomposition temperature, usually about 210° C. The fused material is shaped, if desired, as by extrusion, molding, profile rolling, or in any other manner to the desired form, or when appropriate, to such preliminary form as may be brought to the desired final form by a cold working operation, and then supercooled as by a quick chilling in a water bath. The thickness or cross-sectional area of the material to be supercooled and the temperature of the cooling medium affects the rate of chilling, the thinner the material or the colder the cooling medium the better the supercooling effect. In supercooling the material it is desirable to cool it from its fusion temperature to at least 20° C. within about 15 or 20 seconds, although other rates of cooling may be used and the material may be cooled to lower temperatures as by immersion in a medium having a temperature as low as from 10° C. to −10° C. or lower. After being supercooled the material is thermally conditioned by holding it at a temperature of about 20° C. or lower for a time sufficient to permit subsequent crystallization into a material having a prolonged period of ductility and a reduced or an absence of haziness. The duration of the thermal conditioning treatment does not exceed the time required to bring about an observable change in the density of the material. The period during which the supercooled material remains unchanged in density may be defined as the "crystallization induction period." Since no physically observable changes have been found to occur during the crystallization induction period, and the thermally conditioned supercooled material crystallizes differently from supercooled material not so conditioned, it is believed that crystal nuclei form during the crystallization induction period and their concentration and space distribution determines the character of the crystallization. It is believed further that the number of crystal nuclei formed in the material per unit volume thereof is greater the lower the temperature of the material during the crystallization induction period but their rate of formation decreases as the temperature is decreased. As soon as the crystallization induction period has expired the density of the material can be observed to increase a fraction of a per cent and the material develops a crystallinity which can be observed when it is examined by X-rays.

I have found that the duration of the thermal conditioning treatment to be employed varies with the crystallization induction period and the temperature of the super-cooled material to be treated. It is generally a fractional part of the crystallization induction period which fractional part decreases as the temperature is lowered. At 20° C. the duration of the thermal treatment preferably is made nearly as long as the crystallization induction period, i. e. 70 to 90 per cent or more of this period, while at 0° C. it may be about 50 per cent of the crystallization induction period. At lower temperatures the fraction that may be employed is still less, and since lowering the temperature lengthens the crystallization induction period, it is advantageous to carry out the thermal conditioning treatment in a temperature range such as between 20° C. and −5° C. in which the time consumed is not excessive. Below −5° C. the supercooled material remains in this state for a long time and the rate of formation of crystal nuclei is very low. The duration of the crystalline induction period is therefore very long below about −5° C.

I have found also that by mechanically deforming the supercooled material during the crystallization induction period, its duration is greatly shortened and the thermal conditioning treatment time can be correspondingly shortened, but at some reduction in the increase of ductility unless the deformed material returns to its original form before the end of the period, in which case the reduction in the increase is not so great. For example, after supercooling the fused material to 20° C. and then stretching the supercooled material within its elastic limit and allowing it to retract while being thermally conditioned at 20° C. the time required for the crystallization induction period to expire may be shortened to between about 3 and 40 seconds, but the material when fully crystallized, although free from haze, may possess only a slightly increased ductility. The use of the step of mechanical deformation within the elastic limit during the thermal conditioning treatment is desirable principally to shorten the time of the thermal treatment, provided some sacrifice in the increase in ductility is permissible.

After completing the thermal conditioning with or without mechanical deformation, the material is ready to be finally crystallized. Crystallization is produced by a thermal treatment as by heating for a suitable time at a temperature above 20° C., preferably above about 50° C., and well below the fusion point, until the material is thereby crystallized.

While the material crystallizes the density increases and a crystalline X-ray diffraction pattern can be obtained. As the crystallization nears completion the rate of change of the density becomes less and the change ceases when crystallization is complete.

The material so produced is unique in that although crystalline it is substantially, if not entirely, free from haze when viewed by transmitted light and it possesses a ductility permitting an elongation of at least 300 to 350 per cent or more for as long as one or two months after preparation.

The following examples are illustrative of the practice of the invention:

Example 1

A quantity of a copolymer was prepared consisting of 92 parts of vinylidene chloride and 8 parts of vinyl chloride by weight. The copolymer was plasticized with 7 per cent by weight of di-(alphaphenethyl) ether and stabilized against decomposition by light with 1 per cent by weight of 2-2'-dihydroxy-benzophenone. Some of this copolymer composition was extruded into cordage at 185° C. through an orifice 0.044" in diameter and then supercooled by chilling in an ice water bath at 0° C. A strand of the supercooled material was then thermally treated by placing it in a refrigerator at 10° C. for 16 hours at which time it had increased 0.1 per cent in density, indicating that the crystallization induction period had expired. The thermally treated material was then warmed to 30° C. and maintained at this temperature for 6 minutes during which time crystallization proceeded to substantial completion, as shown by a further density increase of 2.1 per cent and the appearance of a crystalline X-ray diffraction pattern. Specimens of the material subsequently tested showed that it remained perfectly clear, i. e. free from haze, and for a period of two months could be elongated 350 per cent by stretching. During the two month period it was cold workable and the density increased slightly to a total increase of 2.3 per cent over that of the uncrystallized material.

For comparison specimens of the supercooled cordage prepared as above were treated in conventional manner by warming to, and holding at, room temperature, i. e. about 25° C., without a previous thermal treatment until crystallized. The translucency and appearance of the specimens so treated was impaired by haze and they were not cold workable after aging one week.

Example 2

A quantity of a copolymer was prepared consisting of 93 parts of vinylidene chloride and 7 parts by weight of vinyl acetate. The copolymer was plasticized with 8 per cent by weight of a toluene sulfonamide formaldehyde condensation product melting at 62° C. Some of this composition was molded between a pair of flat chrome plated 0.01" thick steel sheets at 190° C. to a thickness of 0.012" and immediately supercooled by immersing the pair of steel sheets while holding the molded polymer between them into an alcohol-dry ice mixture at −10° C. The supercooled molded sheet so prepared was cut into test strips 1" x 6" and one of them was thermally conditioned by maintaining it at 15° C. until its crystallization induction period expired, as shown by a slight increase in density after 100 hours of the thermal treatment. The thermally treated strip was then warmed to 60° C. and held at this temperature to produce crystallization. The strip so crystallized remained perfectly free from haze and was cold workable at room temperature for a period of two months thereafter.

For comparison another of the supercooled strips prepared as above was treated in conventional manner by crystallizing it at 60° C. for five minutes without giving it a prior thermal conditioning treatment. The crystallized strip was then cooled to room temperature. The so treated strip was extremely hazy and incapable of being cold stretched after aging for one day.

*Example 3*

Cordage in the supercooled state as prepared in Example 1 was thermally conditioned by placing it in a water bath at 5° C. for 15 seconds, during which time the material was mechanically deformed by stretching it 1.8 times its original length and then it was allowed to retract to nearly its original length. The so thermally conditioned and mechanically treated material was then crystallized by heating it at 100° C. for 30 seconds after which it was cooled to room temperature. The so treated cordage was haze-free and remained ductile for 3 weeks.

For comparison a similar sample of supercooled cordage prepared as in Example 1 and treated conventionally as by crystallizing at 100° C., but without a previous thermal conditioning and mechanical deformation treatment in the supercooled state, lost its ductility almost immediately and was nearly opaque due to haziness.

*Example 4*

Cordage in the supercooled state prepared as in Example 1 was stretched at 15° C. to 1.5 times its original length and allowed to retract, the retraction requiring 10 seconds. The thermal conditioning started during the foregoing stretching and retraction was continued at 15° C. for two hours when the crystallization induction period ended. The so treated cordage was then crystalized by heating it at 100° C. for 30 seconds. The crystallized cordage remained ductile for three weeks and was free from haze.

Although the method has been illustrated by examples in which it is carried out as a batch process, it will be appreciated that it may be carried out as a continuous process. For example, the material to be treated may be fed continuously to an extrusion machine by which the material is heated and forced through a suitable opening or die to give it form. The fused formed material is then passed continuously into a chilling medium, whereby it is supercooled. The supercooled material may then be led through a thermal conditioning bath of a heat absorbing fluid such as water at the temperature below 20° C. selected for this treatment. The thermal conditioning bath is made long enough so that for the rate of passage of the material through the bath the material spends a sufficient time in the bath to be thermally conditioned at the temperatures employed. The duration of the passage of the supercooled material through the bath as aforesaid will occupy at least a substantial proportion, if not all of the crystallization induction period. It is advantageous to mechanically work the material while passing through the thermal conditioning stage as by giving it a slight stretch and allowing it to retract again to its unstretched size. By such mechanical working the crystalline induction period is shortened and the inventory of material undergoing the thermal conditioning treatment is thereby considerably lessened. Following the thermal conditioning treatment, the material is led through another bath at a higher temperature to cause the thermally conditioned material to crystallize.

I claim:

1. The method of treating a material selected from the class consisting of the normally crystalline polymer, copolymers and interpolymers of vinylidene chloride, which comprises fusing the material at a temperature below the decomposition point, supercooling the fused material, maintaining the supercooled material at a temperature below about 20° C. through a substantial portion of the crystallization induction period but for a period insufficient to effect substantial crystallization thereof while restricting any mechanical deformation of the supercooled material to within the elastic limit, and then heating the so-conditioned material to a temperature above 50° C. but substantially below the fusion point until crystallization is effected, thereby to form a cold-workable crystalline product which is substantially haze-free.

2. The method of treating a material selected from the class consisting of the normally crystalline polymer, copolymers and interpolymers of vinylidene chloride, which comprises fusing the material at a temperature below the decomposition point, chilling the heated material to a temperature below about 20° C., maintaining the chilled material at a temperature between about 20° C. and —5° C. for at least 50 per cent of the crystallization induction period for that temperature but for a period insufficient to effect substantial crystallization while restricting any mechanical deformation of the super-cooled material to within the elastic limit, and then heating the so-conditioned material to a temperature above 50° C. but substantially below the fusion point until crystallization is effected, thereby to form a cold-workable crystalline product which is substantially haze-free.

3. The method of treating a material selected from the class consisting of the normally crystalline polymer, copolymers and interpolymers of vinylidene chloride, which comprises heating the material to a temperature between about 175° and 210° C., chilling the heated material by immersion in a cooling medium having a temperature between —10° C. and 20° C., maintaining the chilled material at a temperature between about —5° C. and 20° C. for at least 70 per cent of the crystallization induction period at the temperature employed but for a period insufficient to effect substantial crystallization while restricting any mechanical deformation of the super-cooled material to within the elastic limit, and then heating the so-conditioned material to a temperature above 50° C. but substantially below the fusion point until crystallized, thereby to form a cold-workable crystalline product which is substantially haze-free.

4. The method of treating a material selected from the class consisting of the normally crystalline polymer, copolymers and interpolymers of vinylidene chloride, which comprises fusing the material at a temperature below the decomposition point, chilling the heated material to a temperature below about 20° C., mechanically deforming the chilled material within its elastic limit and allowing the material to retract within the crystallization induction period and while maintaining a temperature between 20° C. and —5° C., and then heating the so-conditioned material to a temperature above 50° C. but substantially below the fusion point until crystallized, thereby to form a cold-workable crystalline product which is substantialy haze-free.

5. A material selected from the class consisting of the normally crystalline polymer, copolymers and interpolymers of vinylidene chloride, which, in the solidified crystalline state is substantially haze-free and capable of at least 300 per cent elongation at room temperature.

6. A material selected from the class consisting of the normally crystalline polymer, copolymers and interpolymers of vinylidene chloride, which, in the solidified crystalline state is substantially haze-free and capable of at least 350 per cent elongation at room temperature.

7. A normally crystalline vinylidene chloride-vinyl chloride copolymer which, in the solidified crystalline state is substantially haze-free and capable of at least 300 per cent elongation at room temperature.

RALPH M. WILEY.